United States Patent
Richter et al.

(10) Patent No.: US 10,211,649 B2
(45) Date of Patent: Feb. 19, 2019

(54) SYSTEM FOR GENERATING POWER AND CAPACITIVELY CHARGING AND MONITORING A BATTERY PACK

(71) Applicant: R2Z Innovations, Inc., Vancouver (CA)

(72) Inventors: Wolfgang Richter, NW (DE); Faranak Zadeh, Vancouver (CA)

(73) Assignee: EPIC SEMICONDUCTORS INC, Vancouver, British Columbia (CA)

(*) Notice: Subject to any disclaimer, the term of this patent is extended or adjusted under 35 U.S.C. 154(b) by 601 days.

(21) Appl. No.: 14/496,315

(22) Filed: Sep. 25, 2014

(65) Prior Publication Data

US 2016/0094064 A1    Mar. 31, 2016

(51) Int. Cl.
| | | |
|---|---|---|
| H02J 7/00 | (2006.01) | |
| H02J 7/02 | (2016.01) | |
| H02J 7/34 | (2006.01) | |
| H02J 50/05 | (2016.01) | |
| H02J 50/40 | (2016.01) | |
| H02J 50/80 | (2016.01) | |

(52) U.S. Cl.
CPC ........... *H02J 7/0021* (2013.01); *H02J 7/025* (2013.01); *H02J 50/05* (2016.02); *H02J 50/80* (2016.02); *H02J 7/345* (2013.01); *H02J 50/40* (2016.02)

(58) Field of Classification Search
CPC .................. H02J 7/025; H02J 50/05
USPC .......................................... 320/108
See application file for complete search history.

(56) References Cited

U.S. PATENT DOCUMENTS

| | | | | |
|---|---|---|---|---|
| 2007/0126393 A1* | 6/2007 | Bersenev | ............. | H02J 7/0044 320/107 |
| 2007/0129768 A1* | 6/2007 | He | ............. | A61N 1/08 607/34 |
| 2008/0170733 A1* | 7/2008 | Reithinger | ............. | H02J 7/025 381/315 |
| 2013/0328416 A1* | 12/2013 | Whitworth | ............. | H02J 17/00 307/149 |
| 2015/0035474 A1* | 2/2015 | Yang | ............. | H02J 7/0042 320/107 |

* cited by examiner

*Primary Examiner* — David V Henze-Gongola

(57) ABSTRACT

Disclosed is a system and a method for charging and managing power of at least a rechargeable battery pack of an electronic equipment. The system includes a charging section, a battery section and a monitoring section. The charging section provides a capacitively coupled AC power. The battery section receives the capacitively coupled AC power, and further charges the rechargeable battery pack by converting the received AC power into DC power. The monitoring section that monitors the charge status of the battery section and releases command data to the charging section for charging the rechargeable battery pack. Further the charging section provides the AC power to start the charging operation of the rechargeable battery pack, on receiving command data from the monitoring section.

2 Claims, 5 Drawing Sheets

SYSTEM FOR GENERATING POWER AND CAPACITIVELY CHARGING AND MONITORING A BATTERY PACK

BACKGROUND OF THE DISCLOSURE

1. Field of the Invention

The present invention generally relates to a system and a method for charging and managing power of at least a rechargeable battery pack of an electronic equipment, and more particularly relates to a system and a method for providing capacitively coupled charging and monitoring power of at least a rechargeable battery pack.

2. Description of Related Art

Presently the rechargeable battery based power supply have become an inevitable part in our daily life. Generally, most of the electrical and electronic equipments incorporate rechargeable batteries to enable the activation and operation of various arrangements within the equipment. But when there is a charge depletion in the rechargeable batteries, in order to recharge the rechargeable batteries, either we need to the recharge the rechargeable batteries through physical connections to terminals of the battery, or may be replaced with fully charged replacement batteries.

Conventionally the rechargeable battery includes a conductive housing, positive electrode and negative electrode, electrolyte and insulators. In order to recharge the battery, we need to deploy a wired external charger for providing desired power to the rechargeable battery. There is a need for better way of harvesting the electricity energy for contactlessly charging the rechargeable battery.

Moreover certain battery testers enable a user to determine whether the battery has a desirable charge or is operable. However, these battery testers also usually monitor the battery by connecting the battery testers through physical connections to terminals of the battery.

Therefore there is a need of an efficient method and a system for charging and managing power of the rechargeable battery of the electronic equipment. Further the system and the method should determine the charge and load status of the battery through the principle of capacitive coupling corresponding to the battery. Furthermore the method and the system should provide an optimized way to charge and monitor the rechargeable battery of the equipment.

SUMMARY OF THE INVENTION

In accordance with the teachings of the present invention, a system and a method for charging and managing power of the rechargeable battery pack of the electronic equipment.

The present invention provides a system and a method for charging and managing power of the rechargeable battery pack of the electronic equipment. The system includes a charging section, a battery section and a monitoring section. The charging section provides a capacitively coupled AC power. The battery section receives the capacitively coupled AC power, and further charges the rechargeable battery pack by converting the received AC power into DC power. The monitoring section monitors the charge status of the battery section and releases command data to the charging section for charging the rechargeable battery pack. Further the charging section provides the AC power to start the charging operation of the rechargeable battery pack, on receiving command data from the monitoring section.

An object of the present invention is to provide a system to charge and manage power of at least a rechargeable battery pack of the electronic equipment through the principle of capacitive coupling corresponding to the rechargeable battery pack.

Another object of the present invention is to provide a system to charge and manage power of at least a rechargeable battery pack of the electronic equipment using charging section, battery section, monitoring section including an external monitor and an internal monitor. The first external monitor monitors the load status of the generator, and the first internal monitor monitors the charge and the load status of the rechargeable battery pack.

Another object of the present invention is to provide a system for charging and managing power of one or more rechargeable battery sections of respective one or more electronic equipments using charging section, battery section, and monitoring section. The monitoring section further includes a second external monitor and one or more second internal monitors.

These and other objects, features and advantages of the invention will become more fully apparent in the following detailed description, taken in conjunction with the accompanying drawings.

BRIEF DESCRIPTION OF DRAWINGS

The disclosure will provide details in the following description of preferred embodiments with reference to the following figures wherein.

Figure 1:
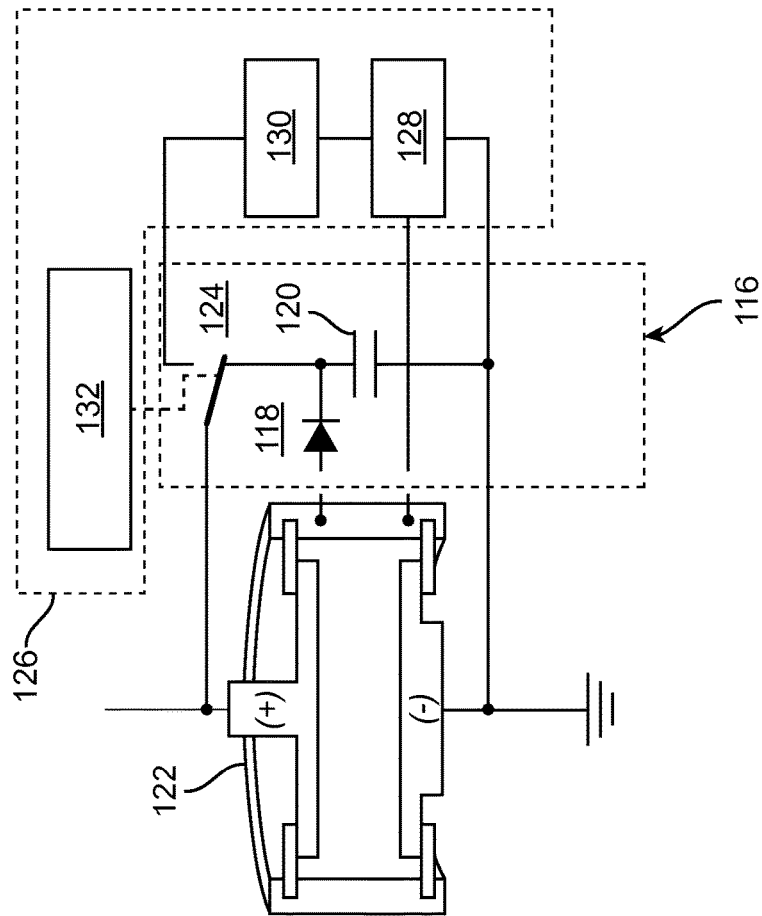
FIG. 1 illustrates a schematic block diagram of a system for charging and managing power of at least a rechargeable battery pack of an electronic equipment, in accordance with a preferred embodiment of the present invention.
Figure 1:
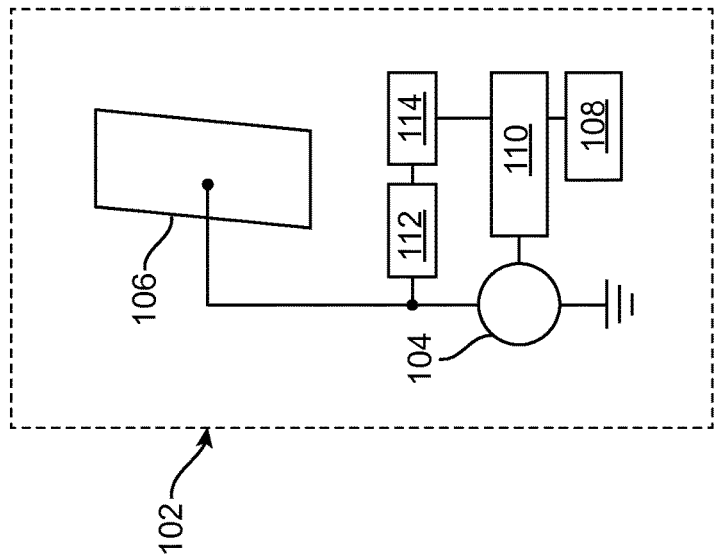

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF DRAWINGS

While this technology is illustrated and described in a preferred embodiment, a system and a method for charging and managing power of at least a rechargeable battery pack of an electronic equipment may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a block diagram of a system for charging and managing power of at least a rechargeable battery pack 122 of an electronic equipment. The system includes a charging section 102, a battery section 116 and a monitoring section 126. The charging section 102 provides a capacitively coupled AC power. The battery section 116 receives the capacitively coupled AC power, and further charges the rechargeable battery pack 122 by converting the received AC power into DC power.

The monitoring section 126 monitors the charge status of the battery section 116 and releases command data to the charging section 102 for charging the rechargeable battery pack 122. The charging section 102 provides the AC power to start the charging operation of the rechargeable battery pack 122, on receiving command data from the monitoring section 126.

In a preferred embodiment of the present invention, the charging section 102 includes a generator 104, at least an electrode 106, a receiver 112, a demodulator 114, a host controller 110 and an interface 108. The battery section 116 includes at least a rectifier 118, and at least a buffer 120. The monitoring section 126 includes a modulator 128, a power monitor 130, and a charge controller 132.

The generator 104 generates an alternating electric field (e-field). The electrode 106 provides capacitively coupled alternating current (AC) power corresponding to the output of the generator 104. Examples of generator 104 includes but not limited to oscillators, PWM, VCO, DAC, gates, and multivibrators. However, it will be readily apparent to those with ordinary skill in the art that the various other types of generator 104 may also be used for generating electric field without deviating from the scope of the present invention.

The receiver 112 receives command data requesting a charge state of the rechargeable battery pack 122 over the modulated alternating electric field. The demodulator 114 demodulates the data received by the receiver 112. The demodulator 114 may include a radio frequency tuner that receives a transmission via the internet, from a cable TV coaxial cable, satellite radio, or a broadcast radio frequency aerial transmission. The radio frequency tuner may receive the command data via electromagnetic radio wave transmission over the carryover wire or through the air.

In the preferred embodiment, the host controller 110 controls at least one of a charging operation and a monitoring operation of the rechargeable battery pack 122 based on the demodulated data received from the demodulator 114. The host controller 110 further releases a control data to perform at least one of the charging operation and the monitoring operation of the rechargeable battery pack 122. The interface 108 is communicatively connected to the host controller 110, for receiving the control data from the host controller 110.

In the preferred embodiment, the interface 108 establishes a communication to the monitoring section 126, and further sends the received control data to the monitoring section 126. The control data is the data associated with controlling of at least one of the charging operation and the monitoring operation of the rechargeable battery pack 122. The communication established by the interface 108 may be a wired communication or a wireless communication. The examples of the interface 108 may include but not limited to a wired interface or an IP network interface that receives a transmission from an internet twisted pair, a wireless interface or other IP medium that receives a transmission from an Internet source and/or, an optical receiver that receives a transmission from an internet fiber or through the air. However, it will be readily apparent to those skilled in the art that the various other types of the interface 108 may also be used for receiving and transmitting data.

The battery section 116 includes the rectifier 118 for receiving the capacitively coupled AC power from the electrode 106, and further converting the received AC power into direct current (DC) power. The buffer 120 stores the DC power received from the rectifier 118. The alternating electric power is harvested by the combined operation of the rectifier 118 and the buffer 120. Example of rectifier 118 includes but not limited to diode, and example of buffer 120 includes but not limited to super capacitor. However, it will be readily apparent to those with ordinary skill in the art that the various other types of rectifier 118 and buffer 120 may also be used for e-field harvesting electric field without deviating from the scope of the present invention.

In the preferred embodiment, the battery section 116 transfers the harvested alternating electric power to the rechargeable battery pack 122. The examples of the rechargeable battery pack 122 includes but not limited to printed battery, silicon battery. However, it will be readily apparent to those with ordinary skill in the art that the various other types of rechargeable battery pack 122 may also be used for storing the electric power without deviating from the scope of the present invention.

As shown in FIG. 1, the rechargeable battery pack 122 includes a conductive housing. The conductive housing couples the electric field emitted by the electrode 106 over its surface. In preferred embodiment of the present invention, the rectifier 118 is connected to the conductive housing of the rechargeable battery pack 122, wherein the conductive housing facilitates the transferring of the capacitively coupled AC power to the rectifier 118 from the electrode 106.

In another preferred embodiment, the battery section 116 transfers the harvested alternating electric power to the rechargeable battery pack 122. However, it will be readily apparent to those with ordinary skill in the art that the various other type of energy harvesting such as chemical based energy harvesting may be performed to store the electric power in rechargeable batteries of all electronic and electrical equipment includes but not limited to mobile phone, laptop, PDA, car, truck, motorcycle, vehicle, train, and airplane without deviating from the scope of the present invention.

In the preferred embodiment, the monitoring section 126 includes a modulator 128 for modulating the AC power with the data pertaining to a charge state of the rechargeable battery pack 122. The power monitor 130 receives the data from the modulator 128, and further analyzes the charge status of the rechargeable battery pack 122. In the preferred embodiment, the power monitor 130 is the electronic circuit comprising a current shunt resistor. The electronic circuit may include an analog-to-digital converter for converting a voltage drop between at least two connection pins of a resistor to a digital signal. However, it will be readily apparent to those with ordinary skill in the art that the various other types of sensors may also be used as the power monitor 130 without deviating from the scope of the present invention.

The charge controller 132 receives the data associated with the analyzed information from the power monitor 130. The charge controller 132 determines the state of charge of the rechargeable battery pack 122 based on the data received from the power monitor 130. The charge controller 132 sends the command data requesting the charge state of the rechargeable battery pack 122 to the host controller 110, based on the determined state of charge of the rechargeable battery pack 122. However, it will be readily apparent to those with ordinary skill in the art that the various other types of controllers may also be used to determine the state of charge the rechargeable battery pack 122 without deviating from the scope of the present invention.

The charge controller 132 further controls the connection of a switch 124 to the rechargeable battery pack 122, during charging operation of the rechargeable battery pack 122. The charge controller 132 controls the connection of the switch 124 to the power monitor 130, during discharging operation of the rechargeable battery pack 122. The examples of switch 124 includes but not limited to a transistor.

In the preferred embodiment, the battery section 116 and the monitoring section 126 are integrated as a single integrated circuit into the rechargeable battery pack 122 of the electronic equipment. The aforementioned configuration enables the charging section 102 to perform the charging operation of the rechargeable battery pack 122. In an exemplary embodiment, depending on the application such as mobile phone and laptop, the charging section 102 may also be integrated with the various types of electronic/electrical equipments.

Figure 2:
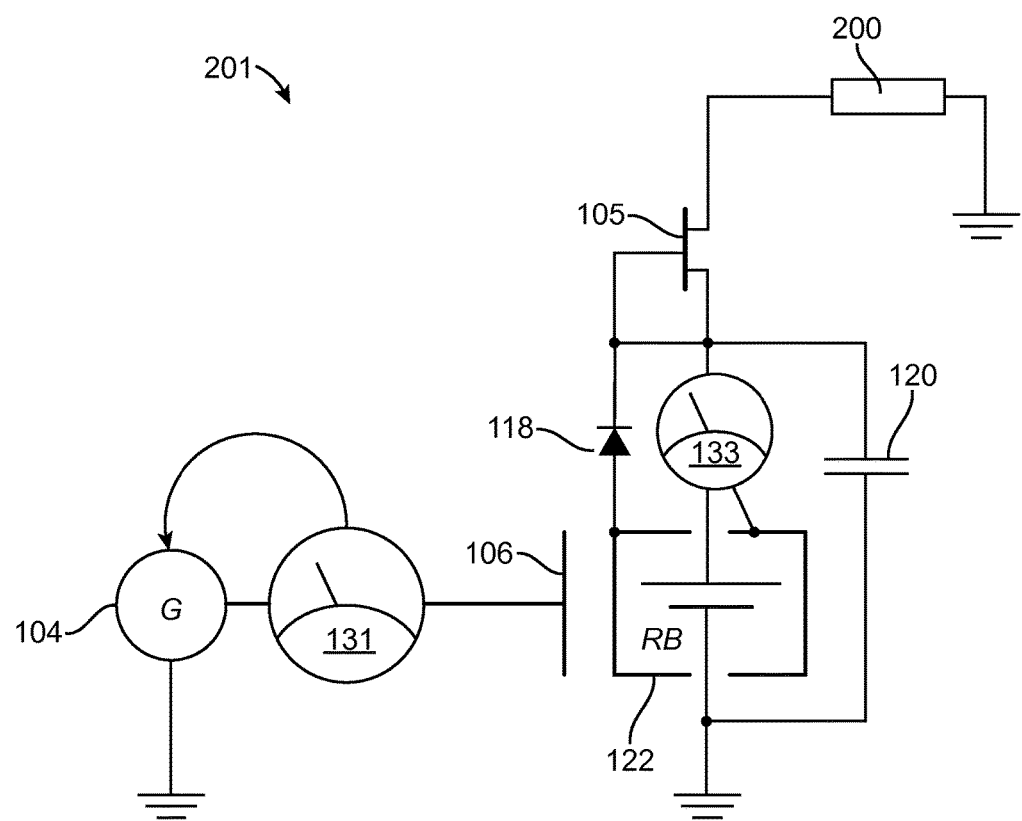
FIG. 2 illustrates a schematic circuit diagram of a system for charging and managing power of at least a rechargeable battery pack of an electronic equipment using charging section, battery section, and monitoring section, in accordance with a first alternative embodiment of the present invention.

FIG. 2 illustrates a schematic circuit diagram of the system 201 for charging and managing power of the rechargeable battery pack 122 of the electronic equipment 200 using a charging section, a battery section and a monitoring section including an external monitor 131 and an internal monitor 133; in a first alternative embodiment of the present invention. The charging section, the battery section and the monitoring section are not shown in FIG. 2.

The charging section (not shown in FIG. 2) provides a capacitively coupled AC power to the rechargeable battery pack 122 of the electronic equipment 200. The rechargeable battery pack 122 is in reach of the charging section (not shown in FIG. 2). The battery section (not shown in FIG. 2) receives the capacitively coupled AC power, and further the battery section (not shown in FIG. 2) charges the rechargeable battery pack 122 by converting the received AC power into DC power.

In the first alternative embodiment, the external monitor 131 and the internal monitor 133 are used to monitor the generator 104 and the rechargeable battery pack 122 during charging and discharging of the rechargeable battery pack 122, respectively. The internal monitor 133 monitors a charge and load status of the rechargeable battery pack 122, and further sends the monitored information to the charge controller (not shown in FIG. 2) of the monitoring section (not shown in FIG. 2). The external monitor 200 monitors a load status of the generator 104, and further sends the monitored information to the host controller (not shown in FIG. 2) of the charging section (not shown in FIG. 2).

The charge controller (not shown in FIG. 2) determines the state of charge of the rechargeable battery pack 122 based on the monitored information received from the internal monitor 133. The charge controller (not shown in FIG. 2) controls the connection of a switch 105 connected between the rechargeable battery pack 122 and the electronic equipment 200, for controlling the charge discharged from the rechargeable battery pack 122 to the electronic equipment 200.

In another preferred embodiment, for example, in case of more than one rechargeable battery pack 122, the switch 105 switches between one or more rechargeable battery packs 122 and the electronic equipment 200. The rechargeable battery packs 122 may be charged and discharged in a serial manner or a parallel manner based on the connection of the switch 105.

The host controller (not shown in FIG. 2) controls at least one of the charging operation and the monitoring operation of the rechargeable battery pack 122 based on the monitored information received from the external monitor 131. Hence the electronic equipment 200 may be recharged and monitored based on the data received from the external monitor 131 and the internal monitor 133.

Figure 3:
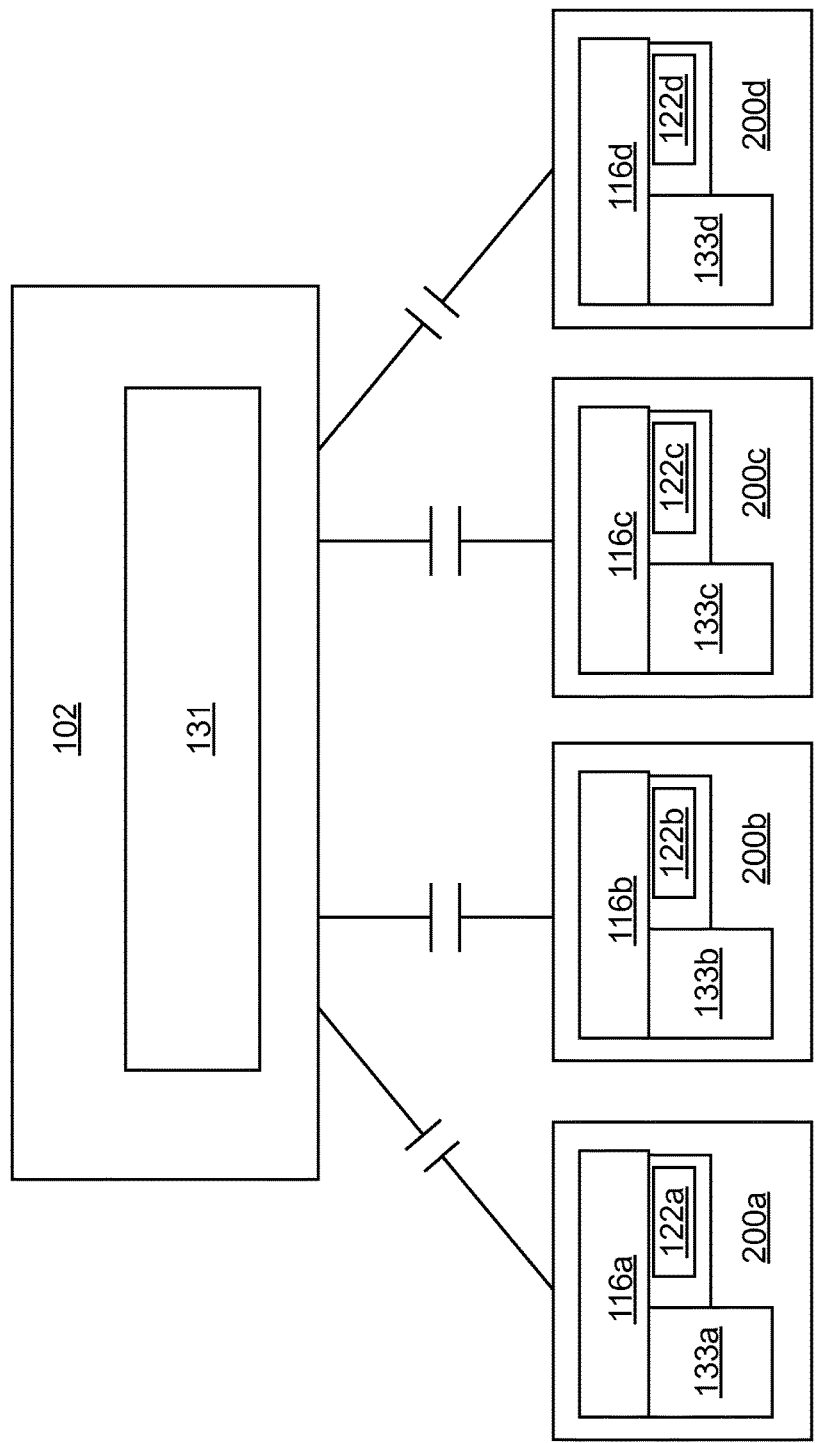
FIG. 3 illustrates a schematic block diagram of a system for charging and managing power of one or more rechargeable battery sections of respective one or more electronic equipments using charging section, battery section, monitoring section including an external monitor and internal monitors, in accordance with a second alternative embodiment of the present invention.

FIG. 3 illustrates a schematic block diagram of a system for charging and managing power of a plurality of rechargeable battery packs 122a, 122b, 122c, 122d of respective plurality of electronic equipments 200a, 200b, 200c, 200d using a charging section 102, battery sections 116a, 116b, 116c, 116d and monitoring sections including a second external monitor 131 and one or more second internal monitors 133a, 133b, 133c, 133d; in a second alternative embodiment of the present invention.

The charging section 102 provides a capacitively coupled AC power to the plurality of rechargeable battery packs 122a, 122b, 122c, 122d of the respective electronic equipments 200a, 200b, 200c, 200d. The battery sections 116a, 116b, 116c, 116d receive the capacitively coupled AC power, and further charge the rechargeable battery packs 122a, 122b, 122c, 122d by converting the received AC power into DC power.

The second internal monitors 133a, 133b, 133c, 133d monitor the charge and load status of the rechargeable battery packs 122a, 122b, 122c, 122d and further releases command data to the charging section 102. The charging section 102 provides the AC power to start the charging operation of the rechargeable battery packs 122a, 122b, 122c, 122d, on receiving command data from the internal monitors 133a, 133b, 133c, 133d. The second external monitor 131 monitors the load status of the generator in the charging section 102.

In the second alternative embodiment, the second internal monitor 133a monitors the rechargeable battery pack 122a of the electronic equipment 200a. The second internal monitor 133b monitors the rechargeable battery pack 122b of the electronic equipment 200b. The second internal monitors 133a, 133b provide command data requesting the charge states of the rechargeable battery pack 122a, 122b to the charging section 102, respectively. The charging section 102 provides the capacitively coupled AC power for recharging the rechargeable battery packs 122a, 122b based on the monitored information received from the external monitor 131 and the internal monitors 133a, and 133b. In the same way the second monitor 133c and the second monitor 133d respectively monitor the rechargeable battery packs 122c, 122d of the electronic equipments 200c, 200d.

Figure 4:
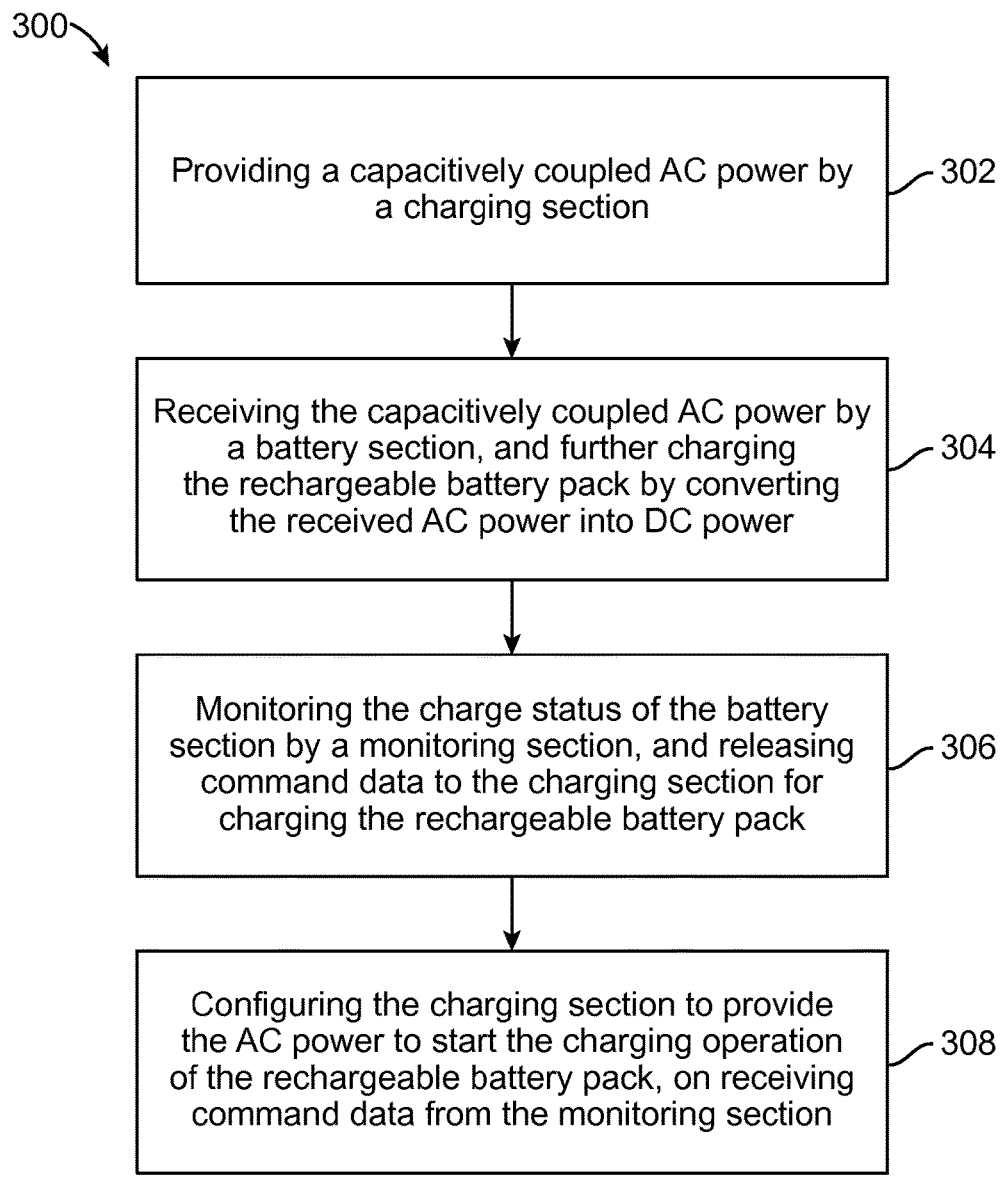
FIG. 4 illustrates a flowchart of a method for charging and managing power of at least a rechargeable battery pack of an electronic equipment, in accordance with the preferred embodiment of the present invention.

FIG. 4 illustrates a flow chart of a method 300 for charging and managing power of a rechargeable battery pack of an electronic equipment. The method 300 initiates with a step 302 of providing a capacitively coupled AC power by a charging section. The step 302 is followed by a step 304 of receiving the capacitively coupled AC power by a battery section, and further charging the rechargeable battery pack by converting the received AC power into DC power. The steps of 302 and step of 304 are explained in detail in conjunction with FIG. 1 of the present invention.

The step 304 is followed by a step 306 of monitoring the charge status of the battery section by a monitoring section, and releasing command data to the charging section for charging the rechargeable battery pack. The step 306 is followed by a step 308 of configuring the charging section to provide the AC power to start the charging operation of the rechargeable battery pack, on receiving command data from the monitoring section 126. The steps of 306 and step of 308 are explained in detail in conjunction with FIG. 1 of the present invention.

Figure 5:
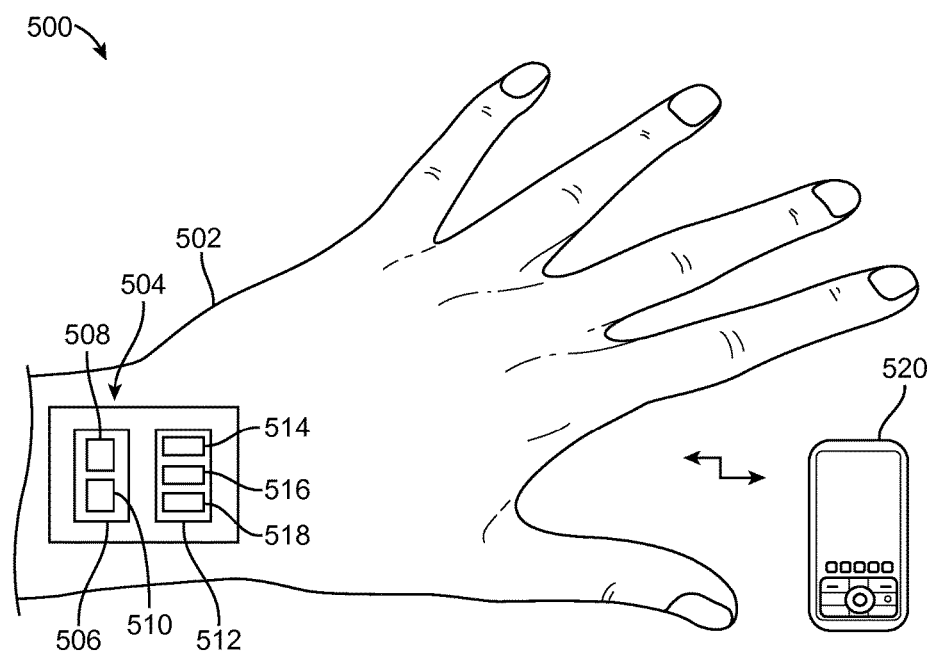
FIG. 5 illustrates an exemplary embodiment of a system including a patch with a printed circuit of battery section, and monitoring section, in accordance with another embodiment of the present invention.

FIG. 5 illustrates an exemplary embodiment of a power management system 500 for receiving at least a human electrolyte to charge an electronic device 520, in accordance with another embodiment of the present invention. The system 500 includes a charging section 502 e.g. human for providing chemically harvested energy and a conductive housing 504 capacitively coupled to the charging section 502. The conductive housing 504 embeds with a battery section 506 and a monitoring section 512. The battery section 506 receives the chemically harvested energy from the charging section 502. The monitoring section 512 monitors a charge status of the battery section 506, wherein the battery section 506 provides the chemically harvested energy to the electronic device 520 on receiving command from the monitoring section 512. The charging section 502 and a battery section 506 are explained in conjunction with the FIG. 1 and FIG. 2 of the present invention.

The conductive housing 504 is a microstrip patch. The battery section 506 includes a printed circuit of rectifier 508 for receiving the chemically harvested energy from the charging section 502, and a buffer 510 for storing the chemically harvested energy received by the rectifier 508. The rectifier 508 and the buffer 510 are configured to further electrically harvest the energy received from the charging section 502, so as to provide the power to the load. Example of rectifier 508 includes but not limited to diode, and example of buffer 510 includes but not limited to accumulator, cells, and super capacitor. However, it will be readily apparent to those with ordinary skill in the art that the various other types of rectifier 508 and buffer 510 may also be used for harvesting energy without deviating from the scope of the present invention.

The monitoring section 512 includes a printed circuit of modulator 514, a power monitor 516, and a controller 518. The modulator 514 modulates a part of harvested power with the data pertaining to a charge state of the battery section 506. The power monitor 516 monitors the charge status of the battery section 506 based on the data received from the modulator 514. The controller 518 controls at least a charging operation and a monitoring operation of the battery section 506 based on the output received from the power monitor 516. Further the monitored information may also be sent to the user equipment 520. The monitoring section 512 is explained in detail in conjunction with FIG. 1 and FIG. 2 of the present invention.

In the exemplary embodiment, the conductive housing 504 includes electrodes selected from the copper, silver, potassium, calcium, sodium, magnesium, aluminum, zinc, iron, nickel, tin, lead, hydrogen, silver, gold and mercury. The conductive housing 504 receives an electrolyte from the charging section 502, wherein the threshold voltage drop of the rectifier is controlled by an offset voltage provided by the electrolyte. The electrolyte is at least one of the body fluid: human blood; sweat; urine; spit; and tear. The output energy electrically harvested in the conductive housing 504 is enhanced by the electrolyte. A voltage element is formed by the combination of the electrodes and electrolyte of the conductive housing, so as to provide an additional offset voltage to the rectifier 508. The threshold voltage drop in the rectifier 508 is controlled by the additional offset voltage provided by the aforementioned electrolyte. The buffer 510 includes any storage unit that provides power to the electric equipment and electronic equipment.

Thus, the present invention provides an efficient and an optimized way of charging and monitoring the rechargeable battery pack. The constant monitoring of the charge and load status of the rechargeable battery pack at a time may be achieved. Since the batteries are monitored during actual charging and discharging operation, the recharging operation of the rechargeable battery pack is initiated at once when the charge state of the rechargeable battery pack depletes. Accordingly the performance and durability of the rechargeable battery may be improved.

There has thus been shown and described a method and a system for charging and managing power of the rechargeable battery pack of the electronic equipment which fulfills all the items and advantages sought there for. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A system for charging and managing power of at least one rechargeable battery pack of electronic equipment, the rechargeable battery pack having a conductive housing, the system comprising:
  a charging section for providing capacitively coupled AC power, the charging section comprising:
    a generator for generating an alternating electric field; and
    only one electrode for providing capacitively coupled AC power from the alternating electric field, the generated alternating electric field couples with the conductive housing of the rechargeable battery pack;
  a battery section for receiving the capacitively coupled AC power over the surface of the conductive housing of the rechargeable battery pack, and further charging the rechargeable battery pack by converting the received AC power into DC power, the battery section comprising:
    a rectifier connected to the conductive housing of the rechargeable battery pack for converting the capacitively coupled AC power into DC power;
    a buffer for filtering and storing the DC power received from the rectifier;
  wherein, the rectifier and the buffer transfer the harvested electric power to rechargeable battery pack;
  a monitoring section for monitoring the charge status of the battery section and releasing command data to the charging section for charging the rechargeable battery pack, the monitoring section comprising:
    a modulator for modulating the AC power received from the charging section with data pertaining to a charge state of the rechargeable battery pack;
    a power monitor for receiving data from the modulator, and further analyzing the charge status of the rechargeable battery pack;

a charge controller receiving data associated with the analyzed information from the power monitor;

an external monitor configured in the charging section to monitor the generator and the rechargeable battery pack during charging and discharging, and further for providing the monitored information to the host controller; and an internal monitor connected to the battery section of the rechargeable battery pack for monitoring a charge and load status of the rechargeable battery pack and further for providing the monitored information to the charge controller;

wherein the charging section provides the AC power to start the charging operation of the rechargeable battery pack, upon receiving command data from the monitoring section.

2. The system according to claim 1, wherein the charging section further comprising:

a receiver for receiving data from the rechargeable battery pack about a charge state of the rechargeable battery pack;

a demodulator for demodulating the data received by the receiver;

a host controller for controlling at least one of a charging operation and a monitoring operation of the rechargeable battery pack based on the demodulated data; and at least one interface connected to the host controller for communicating over a communication network.

* * * * *